Nov. 11, 1969  J. F. CZERNIEWICZ  3,477,481
DRIVEN CUTTING TOOL
Filed March 28, 1967
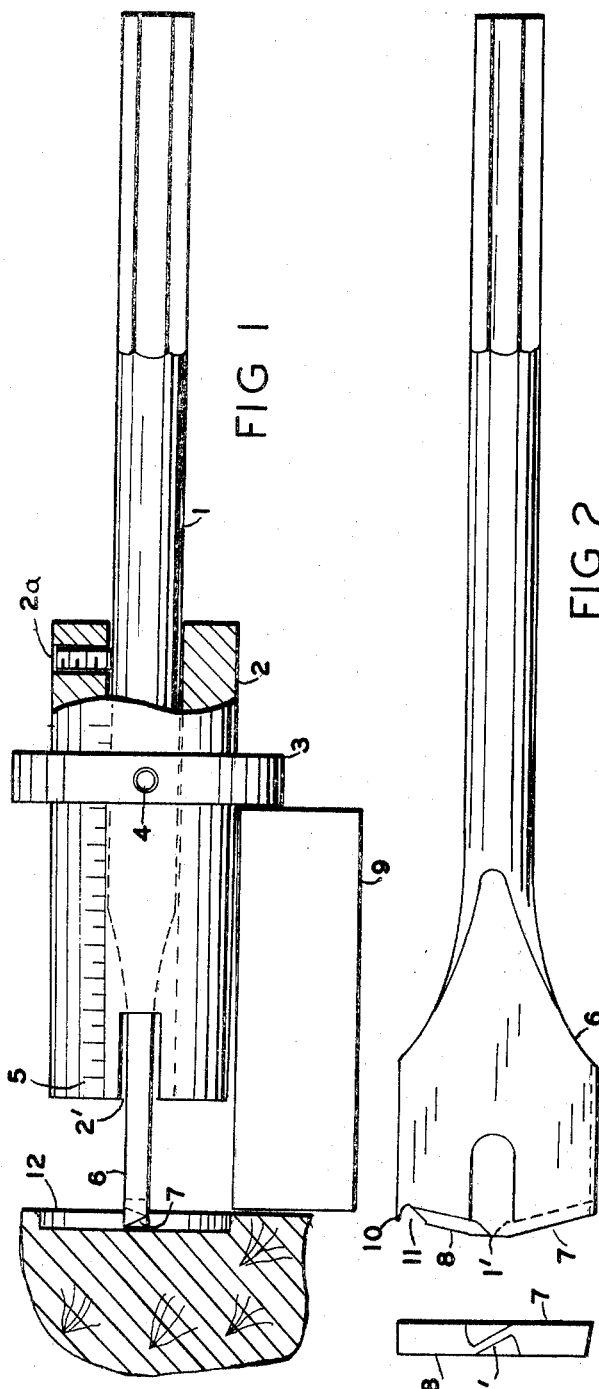
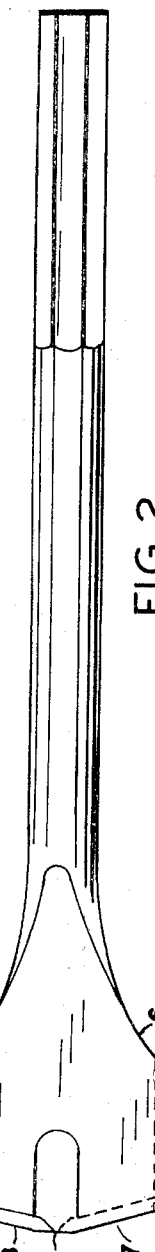
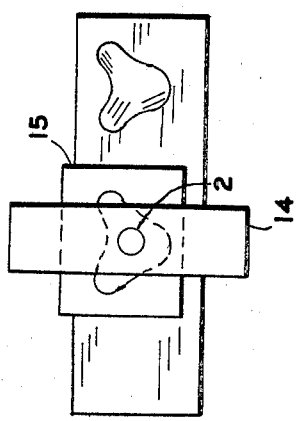
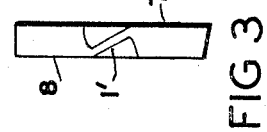
INVENTOR.
JOHN F. CZERNIEWICZ
BY James P. Malone 3,477,481
DRIVEN CUTTING TOOL
John F. Czerniewicz, 337 Foch Blvd.,
Mineola, N.Y. 11501
Filed Mar. 28, 1967, Ser. No. 626,531
Int. Cl. B27c 5/00
U.S. Cl. 144—144                    3 Claims

ABSTRACT OF THE DISCLOSURE

A cutting tool adapted to be driven by an electric drill comprising, a tool holder having an adjustable depth control and a shank member mounted in said holder. The shank member has a flat end portion having a pair of cutting blades. A cutting spur is mounted on the outside edge of one of said blades. When held against a guide the tool will cut grooves, slots, or large holes of predetermined adjustable depth.

---

This invention relates to cutting tools and is an improvement over my prior Patent 2,920,662 granted Jan. 12, 1960 entitled Mortising Attachment for Portable Drill.

Its purpose is to perform operations ordinarily accomplished through the skillful use of a wood chisel, such as cutting mortises for mortise and tenon joints, dados, grooves and, in general, removing areas of wood or other soft material to whatever shape or depth may be required.

Its advantage over the wood chisel, which it supplants, is in the ease with which it is used, requiring very little skill and the speed with which various operations can be performed, which is much faster than with a hand chisel. It works equally well with or across the grain, or at any angle to the grain.

Used with any straight edge, such as a board, it can be made to cut a groove or dado precisely equal in width to the width of the tool, thus cutting a groove, dado or mortise of perfect size for the most common thickness of softwood lumber, when using a ¾" cutter.

Used with a pair of straight edges separated by a spacer of any desired width, the wood in the enclosed area can be removed to a uniform depth up to five inches.

Used with a template or pattern cut out of ¾" thick wood and a supporting bridge, it can be made to remove wood to a precise, predetermined depth to the shape of the template, for instance, in hollowing a round or oval recess in a piece of wood.

Thus, whether cutting a groove or mortise with the grain, a dado for a book shelf across the grain, or a recess for an inlay or an ash tray, this tool will do the work of a wood chisel supplemented by a hand router.

The tool generally consists of a rotating flat blade with one outside cutting spur, supported in a cylinder which is a tool holder, and depth control by an adjustable ring on the cylinder.

The cutting edges of the tool perform three distinct operations. The first is to penetrate the wood like a drill, but on being moved along, to form a trench or angular groove. The second step is performed by a knife-like spur at the outer edge of the cutter and about .040" above the surface of the wood at initial contact. This spur severs the fibers of the wood at the outer edge of the cut being made, so that the edges of a dado being cut across the grain are sharp and not torn away. The third operation is performed by the cutter opposite the spur which rakes away the stock inside the diameter scored by the spur.

Accordingly, a principal object of the invention is to provide new and improved cutting tool means.

Another object of the invention is to provide new and improved cutting tool means for cutting slots and grooves in wood.

Another object of the invention is to provide new and improved attachment means for a portable electric drill.

Another object of the invention is to provide new and improved motor driven cutting tool adapted to cut grooves comprising, a holder member, a shank member seated and centered in said holder, a flat end portion on said shank said flat end portion having a pair of cutting blades mounted at equal angles to the axis of said shank member, and a cutting spur mounted on the outside edge of one of said cutting blades.

These and other objects of the invention will be apparent from the following specification and drawings of which:

FIGURE 1 is a side view of the tool and holder.
FIGURE 2 is a front view of the shank member.
FIGURE 3 is a side view of the shank member.
FIGURE 4 is a plan view of use with a guide enclosure.

Referring to the figures, the invention comprises a tool bit or shank member 1 which is adapted to be mounted in a holder 2, by set screw 2a. The holder 2 is a cylinder with hollow shaft way. A depth adjustment ring 3 is adapted to be mounted on the holder 2 and secured to the holder with a set screw 4. The holder 2 preferably has engraved calibration marks 5, for instance every ⅛ inch. The depth adjustment ring engages a side guide member 9 to control the depth of the cut 12. The guide member may be a straight member or may be curved or formed as desired. The shank member is adapted to be mounted in an electric drill. Holder 2 has slots 2' adapted to engage the flat end 6 of the shank member.

Referring to FIGURE 4, when it is desired to cut a large aperture the guide may be a complete enclosure 15 and the holder 2 may ride in a bridge member 14 which is adapted to slide on the enclosure 15.

The shank member 1 has a flat end portion 6 which has a pair of cutting blades 7 and 8 mounted at equal angles with respect to the axis of the shank member. A thin cutting web 1' is formed between the blades 7 and 8. A sharp edged cutting spur member 10 is mounted at the outside edge of one of the blades and the area 11 immediately adjacent the spur 10 is hollowed to permit sharpening the spur.

The operation of the tool is as follows:

While the cutting edge performs its three functions, the tubular tool holder rests against the edge or edges of wooden guides clamped to the work. The guide determines the shape and length of the groove being formed.

The adjustable ring on the tool holder is set at a height which limits the depth of cut, and is locked to the tool holder with a set screw so that it stops the cutting action of the tool as it reaches and rides on the top of the guiding straight edge.

A simple bridge, consisting of a length of wood pierced by a hole large enough to permit free rotation of the tool while the depth gage rests on its surface, can be made by any user of this tool to remove stock within a shaped area bounded by the sides of a template cut in stock about ¾" thick. In use, the bridge with its ends resting on the template is moved about to guide the tool over the area enclosed by the sides of the cut out template. A depth of about ¼ to ⅛" deep is removed at each pass of the tool, and the depth gage readjusted until the desired depth is reached. By this process, a shallow recess may be cut to receive an inlay, or a deep hollow cut to house a dish or ash tray.

Guides and templates are required only until the depth of the cut reaches about one half inch after which the shape of the cut is maintained by using it as its own guide. Thus, a mortise two inches deep would require use of a guide or template only to get it started, and could be completed after the first half inch of depth by use of the cutter along and with the guide removed.

Since the tool cuts with the end alone and at slow speeds of 1000 to 2000 r.p.m., it is as safe to use as any drill, and cannot cause injury if used with moderate skill and care.

Many modifications may be made by those who desire to practice the invention without departing from the scope thereby which is defined by the following claims:

1. A laterally movable motor driven cutting tool adapted to cut grooves of predetermined depth comprising:
   a holder member adapted to bear against a guide member,
   a shank member adjustably mounted in said holder,
   a flat end portion on said shank, said flat end portion having a pair of cutting blades mounted at equal angles to the axis of said shank member,
   a cutting spur mounted on the outside edge of one of said cutting blades, and
   depth adjusting means for said cutter comprising a ring adjustably mounted on said holder.

2. Apparatus as in claim 1 having guide means for said holder member.

3. Apparatus as in claim 2 wherein said guide means includes at least two side guides and a top guide slidably mounted on said side guides, said holder member being mounted in said top guide.

References Cited

UNITED STATES PATENTS

| | | | |
|---|---|---|---|
| 2,358,077 | 9/1944 | Koett | 145—116 |
| 2,883,888 | 4/1959 | Stewart | 145—116 X |
| 3,392,762 | 7/1968 | Greenley | 144—27 X |

FOREIGN PATENTS 88,726  6/1960  Denmark.

ANDREW R. JUHASZ, Primary Examiner

GIL WEIDENFELD, Assistant Examiner

U.S. Cl. X.R.

77—61; 144—27, 70, 219; 145—116